United States Patent
Fukaishi

(10) Patent No.: US 6,233,090 B1
(45) Date of Patent: May 15, 2001

(54) OPTICAL AMPLIFIER

(75) Inventor: Kosuke Fukaishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/280,833

(22) Filed: Mar. 30, 1999

(30) Foreign Application Priority Data

Mar. 31, 1998 (JP) .................................. 10-101810

(51) Int. Cl.⁷ .............................. H01S 3/30; H04B 10/30
(52) U.S. Cl. ...................... 359/337; 359/134; 359/174; 359/341
(58) Field of Search .................... 359/130, 134, 359/160, 174, 337, 341

(56) References Cited

U.S. PATENT DOCUMENTS

| | | | |
|---|---|---|---|
| 5,532,864 | * 7/1996 | Alexander et al. | 359/337 |
| 5,608,571 | * 3/1997 | Epworth et al. | 359/341 |
| 5,698,615 | * 12/1997 | Alexander | 359/134 |
| 5,710,659 | * 1/1998 | Cline | 359/341 |
| 5,812,712 | * 9/1998 | Pan . | |
| 5,815,308 | * 9/1998 | Kim et al. | 359/341 |
| 5,822,113 | * 10/1998 | Delavaux et al. | 359/341 |
| 5,867,306 | * 2/1999 | Isshiki | 359/341 |
| 5,978,131 | * 11/1999 | Lauzon et al. | 359/337 |

FOREIGN PATENT DOCUMENTS 7-30178   1/1995 (JP) .

* cited by examiner

*Primary Examiner*—Nelson Moskowitz
(74) *Attorney, Agent, or Firm*—McGuireWoods LLP

(57) ABSTRACT

An optical amplifier with improved output power and reduced noise is disclosed. A first optical fiber amplifier is pumped by a first pumping light and a second optical fiber amplifier is pumped by a second pumping light. A direction-dependent filter is connected between the first and second optical fiber amplifiers. Only input signal light and the first pumping light are passed through into the second optical fiber amplifier. Only the second pumping light is passed through into the first optical fiber amplifier.

17 Claims, 2 Drawing Sheets

OPTICAL AMPLIFIER

BACKGROUND OF THE INVENTION

1. Field of the Invention

The present invention generally relates to an optical amplifier and in particular to an optical amplifier using an optical fiber amplifier pumped by a light source.

2. Description of the Related Art

The noise characteristic of an optical fiber amplifier is one of the important performance items. To reduce in noise level, there has been disclosed an optical amplifier having two rare-earth-doped fibers connected in series through an optical isolator (see Japanese Patent Unexamined Publication No. 7-30178). The optical isolator can block ASE (Amplified Spontaneous Emission) propagating from the second rare-earth-doped fiber at the output stage, resulting in reduced noise at the first stage.

According to the conventional optical circuit of an optical fiber amplifier, however, ASE generated in the first rare-earth-doped fiber at the input state passes through the optical isolator into the second rare-earth-doped fiber. Therefore, the second rare-earth-doped fiber amplifies the ASE as well as the signal light, resulting in reduced efficiency and output power. In other words, the pumping energy of the light pumping the second rare-earth-doped fiber is consumed to amplify not only the signal light but also the ASE.

SUMMARY OF THE INVENTION

An object of the present invention is to provide an optical amplifier, which can achieve high output power and low noise.

According to the present invention, an optical circuit includes a first optical fiber amplifier pumped by a first pumping light, a second optical fiber amplifier pumped by a second pumping light, and a direction-dependent filter connected between the first and second optical fiber amplifiers, which has a first filtering characteristic in a direction and a second filtering characteristic in an opposite direction.

The direction-dependent filter may be comprised of an optical circulator having four ports, wherein a first port is connected to an output end of the first optical fiber amplifier, a third port is connected to an input end of the second optical fiber amplifier. Further, a first filter having the first filtering characteristic is connected to a second port of the optical circulator, and a second filter having the second filtering characteristic is connected to a fourth port of the optical circulator. The first filter filters out light components other than an input signal light and the first pumping light. The second filter filters out light components other than the second pumping light.

As described above, according to the present invention, the direction-dependent filter is connected between the first and second optical fiber amplifiers. Therefore, noise light generated at the first stage is filtered out and only the signal light and the first pumping light are transferred from the first optical fiber amplifier to the second optical fiber amplifier. Therefore, efficient amplification can be achieved at the second stage.

Further, noise light generated at the second stage is also filtered out and only the second pumping light is transferred from the second optical fiber amplifier to the first optical fiber amplifier. Therefore, a reduction in noise can be achieved at the first stage.

DETAILED DESCRIPTION OF THE PREFERRED EMBODIMENT

Figure 1:
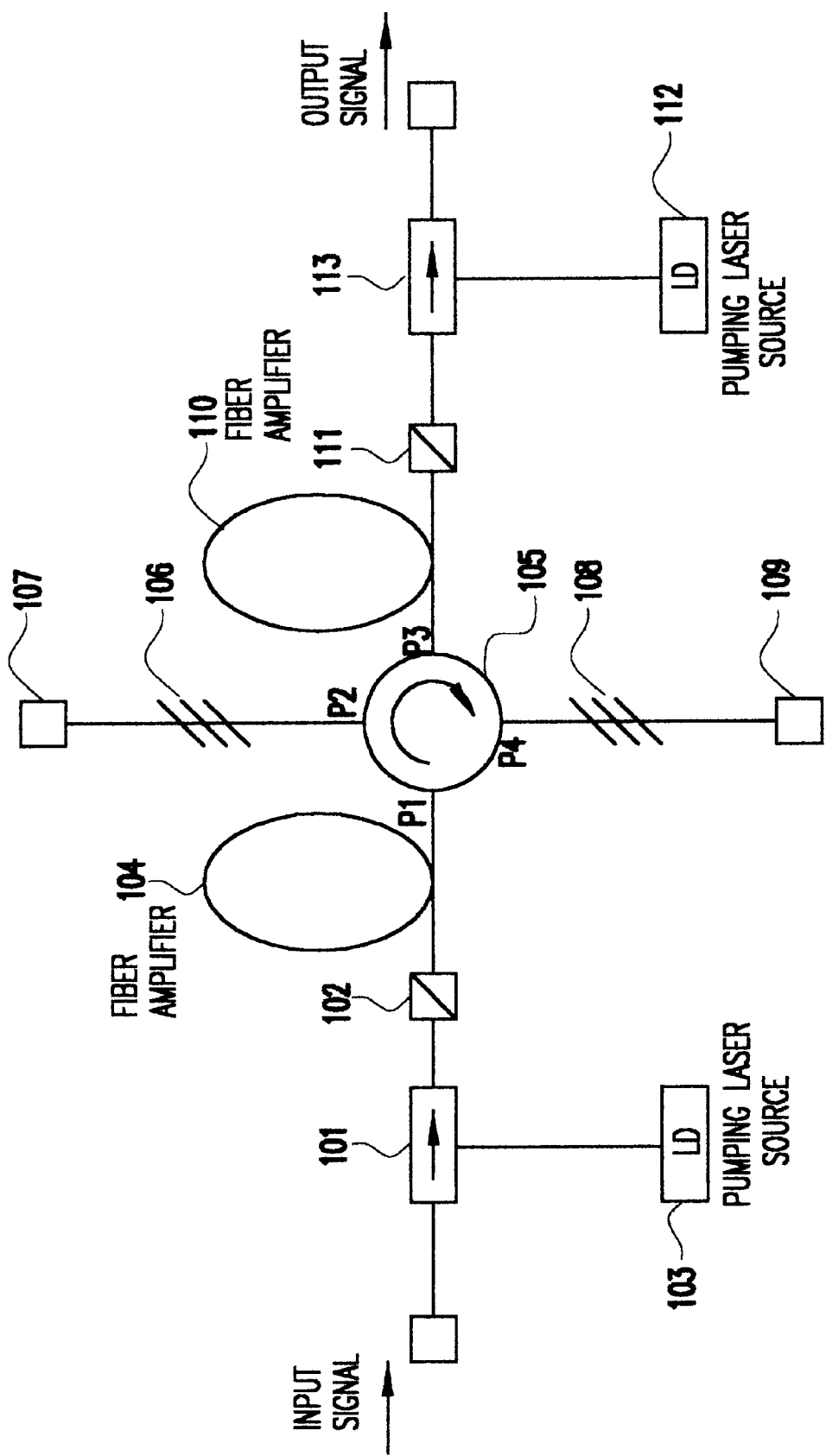
FIG. 1 is a diagram showing an optical amplifier according to an embodiment of the present invention.

Referring to FIG. 1, an optical amplifier according to an embodiment of the present invention has two optical fiber amplifiers (104, 110) connected in cascade through a direction-dependent filter (105–109). An optical fiber amplifier may be a Rare-earth-doped fiber, typically Erbium-doped fiber (EDF).

More specifically, the input port of the optical amplifier is connected to the input terminal of the optical isolator 101. The output terminal of the optical isolator 101 is connected to a first terminal of an optical combiner 102 such as a WDM fiber coupler. A second terminal of the optical combiner 102 is connected to a first pumping laser source 103 such as a laser diode emitting a pumping light of a predetermined wavelength.

A third terminal of the optical combiner 102 is connected to the one end of a first optical fiber amplifier 104. The first optical fiber amplifier 104 is connected to a second optical fiber amplifier 110 through the direction-dependent filter (105–109) having direction-dependent filtering characteristics as will be described in detail.

The one end of the second optical fiber amplifier 110 is connected to the direction-dependent filter (105–109) and the other end is connected to a first terminal of an optical combiner 111 such as a WDM fiber coupler. A second terminal of the optical combiner 111 is connected to a second pumping laser source 112 such as a laser diode emitting light of the predetermined wavelength. Here, the first and second pumping laser source 103 and 112 emit the same wavelength pumping light. A third terminal of the optical combiner 111 is connected to the input terminal of an optical isolator 113 and the output terminal of the optical isolator 113 is connected to an output port of the optical amplifier.

Input signal light passes through the optical isolator 101 into the optical combiner 102. The first pumping light emitted from the first laser source 103 also enters the optical combiner 102. The input signal light and the first pumping light are supplied from the optical combiner 102 to the first optical fiber amplifier 104. The first optical fiber amplifier 104 pumped by the first pumping light amplifies the input signal light with ASE generated therein. Therefore, the output light including the first amplified signal light and the first pumping light with noises including the ASE enters the direction-dependent filter (105–109).

As will be described later, the direction-dependent filter (105–109) filters out the noise light including the ASE from the output light of the first optical fiber amplifier 104 and passes only the first amplified signal light and the first pumping light through into the second optical fiber amplifier 110. Since the second optical fiber amplifier 110 is pumped by the second pumping light emitted by the second pumping laser source 112, the second optical fiber amplifier 110 is pumped by the first and second pumping light. Therefore, the second optical fiber amplifier 110 amplifies the first amplified signal light efficiently, resulting in high power output.

The second pumping light and the ASE generated in the second optical fiber amplifier 110 may propagate back to the direction-dependent filter (105–109). However, the direction-dependent filter (105–109) filters out the noise light including the ASE and passes only the second pumping light through into the first optical fiber amplifier 104. Therefore, the first optical fiber amplifier 104 is prevented from saturation in ASE, resulting in suppressed noise due to the ASE.

Figure 2:
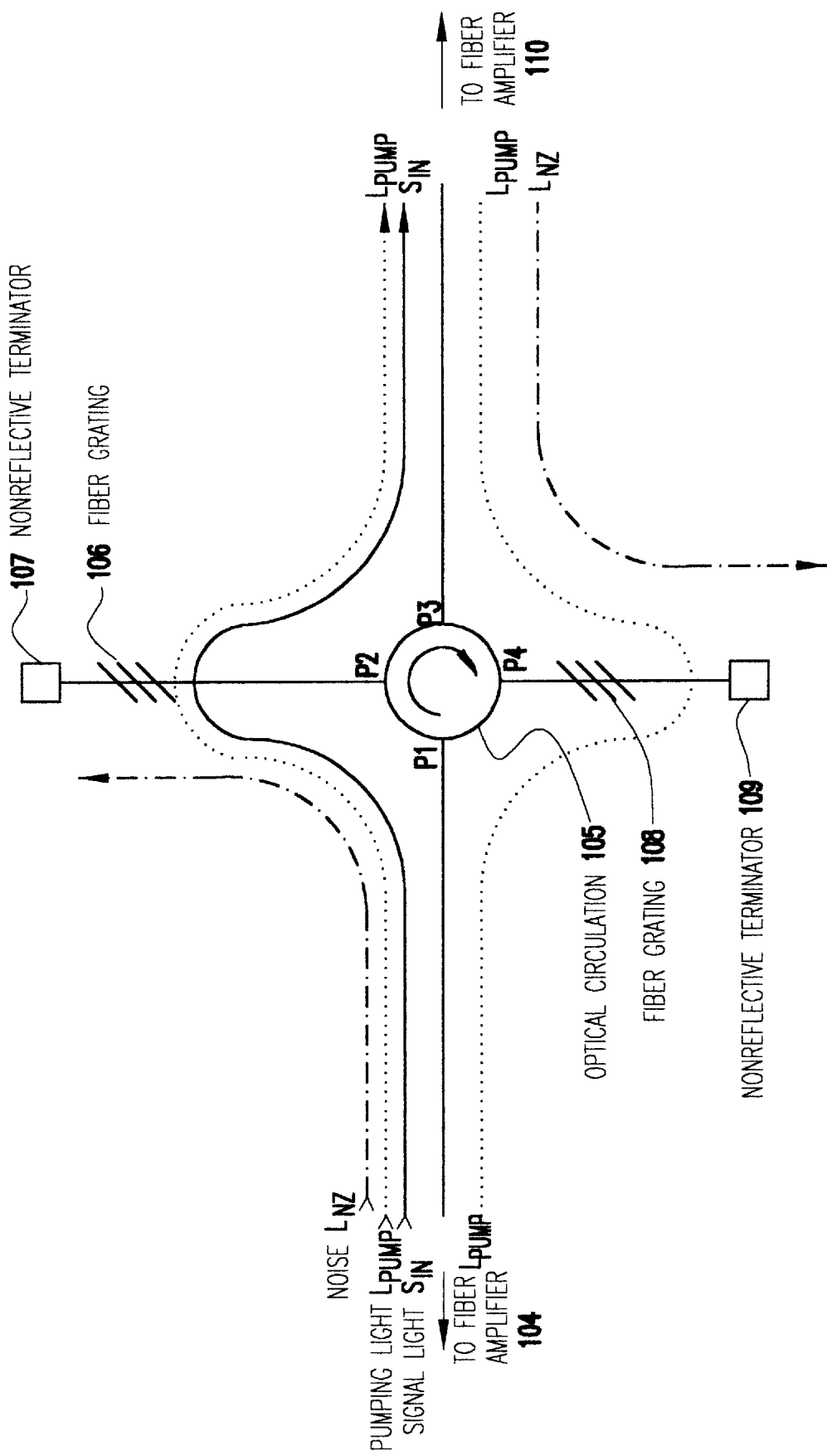
FIG. 2 is a diagram showing a direction-dependent filter used in the optical amplifier to explain an operation of the embodiment.

Referring to FIG. 2, the direction-dependent filter includes an optical circulator 105 having four ports P1–P4. The light input at the first port P1 is output from the second port P2. The light input at the second port P2 is output from the third port P3. The light input at the third port P3 is output from the fourth port P4. The light input at the fourth port P4 is output from the first port P1.

The first port P1 is connected to the first optical fiber amplifier 104 and the third port P3 is connected to the second optical fiber amplifier 110. The second port P2 is connected to a fiber grating 106 which is connected to a non-reflective terminator 107. The fourth port P4 is connected to a fiber grating 108 which is connected to a non-reflective terminator 109.

The fiber grating 106 has a first filtering characteristic such that only the light having wavelengths of the input signal light $S_{IN}$ and the first pumping light $L_{PUMP}$ is reflected and the other light $L_{NZ}$ is a noise passed through. The passed light $L_{NZ}$ is absorbed by the non-reflective terminator 107. The reflected light including only the input signal light $S_{IN}$ and the first pumping light $L_{PUMP}$ goes back to the second port P2 of the optical circulator 105. Therefore, the reflected light including only the input signal light $S_{IN}$ and the first pumping light $L_{PUMP}$ goes out from the third port P3 to the second optical fiber amplifier 110.

The fiber grating 108 has a second filtering characteristic such that only the light having the wavelength of the second pumping light $L_{PUMP}$ is reflected and the other light $L_{NZ}$ is as noise passed through. The passed light $L_{NZ}$ is absorbed by the non-reflective terminator 109. The reflected light including only the second pumping light $L_{PUMP}$ goes back to the fourth port P2 of the optical circulator 105. Therefore, the reflected light including only the second pumping light $L_{PUMP}$ goes out from the first port P1 to the first optical fiber amplifier 104.

Another wavelength-selective reflector which can reflect only the light of desired wavelength ranges may be used in place of the fiber gratings 106 and 108, for example, a dielectric multilayer reflector composed of a plurality of dielectric layers having different refractive indexes. However, a fiber grating will be sued preferably. A fiber grating having a desired reflection characteristic can be formed by applying an ultraviolet laser bean generated by a laser source such as an excimer laser to the surface of an optical fiber at predetermined positions. In the case where an optical fiber is used to connect between the second port P2 of the optical circulator 105 and the non-reflective terminator 107 and between the fourth port P4 of the optical circulator 105 and the non-reflective terminator 109, the fiber grating is preferably used to allow easy fabrication.

As described above, according to the present invention, a direction-dependent filter (105–109) is connected between the first and second optical fiber amplifiers 104 and 110. Therefore, ASE light generated at the first stage is filtered out and only the signal light and the pumping light are transferred from the first optical fiber amplifier 104 to the second optical fiber amplifier 110, resulting in efficient amplification at the second stage. Further, ASE light generated at the second stage is also filtered out and only the pumping light is transferred from the second optical fiber amplifier 110 to the first optical fiber amplifier 104, resulting in further reduced noise at the first stage.

What is claimed is:

1. An optical circuit comprising:
   a first optical fiber amplifier pumped by a first pumping light;
   a second optical fiber amplifier pumped by a second pumping light; and
   a direction-dependent filter connected between the first and second optical fiber amplifiers, having a first characteristic in a first direction and a second filtering characteristic in an opposite direction,
   said direction dependent filter comprising an optical circulator having four ports,
   wherein a first port is connected to an output end of the first optical fiber amplifier,
   a second port is connected to a first grating in series with a first non-reflective terminator,
   a third port is connected to an input end of the second optical fiber amplifier, and
   a forth port is connected to a second grating in series with a second non-reflective terminator.

2. An optical circuit comprising:
   a first optical fiber amplifier pumped by a first pumping light;
   a second optical fiber amplifier pumped by a second pumping light; and
   a direction-dependent filter connected between the first and second optical fiber amplifiers, having a first filtering characteristic in a first direction and a second filtering characteristic in an opposite direction,
   wherein the direction-dependent comprises:
      an optical circulator having four ports, wherein a first port is connected to an output end of the first optical fiber amplifier, a third port is connected to an input end of the second optical fiber amplifier;
      a first filter having the first filtering characteristic, connected to a second port of the optical circulator; and
      a second filter having the second filtering characteristic, connected to a fourth port of the optical circulator.

3. The optical circuit according to claim 2, wherein
   the first filter filters out light components other than an input signal light and the first pumping light; and
   the second filter filters out light components other than the second pumping light.

4. The optical circuit according to claim 2, wherein the first filter comprises:
   a first wavelength-selective reflector reflecting light of a wavelength range corresponding to the input signal light and the first pumping light; and
   a first non-reflective terminator absorbing light passing through the first wavelength-selective reflector,
   the second filter comprises:
      a second wavelength-selective reflector reflecting light of a wavelength range corresponding to the second pumping light; and
      a second non-reflective terminator absorbing light passing through the second wavelength-selective reflector.

5. The optical circuit according the claim 4, wherein the first wavelength-selective reflector and the second wavelength-selective reflector are a fiber grating.

6. The optical circuit according to claim 4, wherein the first wavelength-selective reflector and the second wavelength-selective reflector are a dielectric multilayer reflector.

7. The optical circuit according to claim 1, wherein each of the first and second optical fiber amplifiers comprises a rare-earth-doped fiber.

8. The optical circuit according to claim 7, wherein each of the first and second optical fiber amplifiers comprises an erbium-doped fiber.

9. The optical circuit according to claim 1, wherein the first and second pumping light has the same wavelength.

10. An optical amplifier for amplifying an input signal light received at an input port to output an output signal light at an output port, the optical amplifier comprising:

a first optical isolator connected to the input port, for inputting the input signal light in a first direction;

a first optical combiner for combing the input signal light and a first pumping light;

a first optical fiber amplifier receiving the input signal light and the first pumping light from the optical combiner, for amplifying the input signal with pumped by the first pumping light to produce a first output light;

a direction-dependent filter receiving the first output light from the first optical fiber amplifier, the direction-dependent filter having a first filtering characteristic in a direction and a second filtering characteristic in an opposite direction;

a second optical fiber amplifier receiving light output from the direction-dependent filter, for amplifying the input signal with pumped by a second pumping light to produce a second output light;

a second optical combiner for combining the second output light and the second pumping light; and a second optical isolator connecting the second optical combiner with the output port.

11. The optical amplifier according to claim 10, wherein the direction-dependent filter comprises:

an optical circulator having four ports, wherein a first port is connected to an output end of the first optical fiber amplifier, a third port is connected to an input end of the second optical fiber amplifier;

a first filter having the first filtering characteristic, connected to a second port of the optical circulator; and a second filter having the second filtering characteristic, connected to a fourth port of the optical circulator.

12. The optical amplifier according to claim 11, wherein the first filter filters out light components other than an input signal light and the first pumping light; and the second filter filters out light components other than the second pumping light.

13. The optical circuit according to claim 12, wherein the first filter comprises:

a first wavelength-selective reflector reflecting light of a wavelength range corresponding to the input signal light and the first pumping light; and a first non-reflective terminator absorbing light passing through the first wavelength-selective reflector, the second filter comprises:

a second wavelength-selective reflector reflecting light of a wavelength range corresponding to the second pumping light; and a second non-reflective terminator absorbing light passing through the second wavelength-selective reflector.

14. The optical amplifier according to claim 13, wherein the first wavelength-selective reflector and the second wavelength-selective reflector are a fiber grating.

15. The optical amplifier according to claim 13, wherein the first wavelength-selective reflector and the second wavelength-selective reflector are a dielectric multilayer reflector.

16. The optical amplifier according to claim 10, wherein each of the first and second optical fiber amplifiers comprises a rare-earth-doped fiber.

17. The optical amplifier according to claim 16, wherein each of the first and second optical fiber amplifiers comprises an erbium-doped fiber.

* * * * *